(No Model.)
R. H. HORNE & S. C. SMITH.
BOX FOR SCALDING POULTRY.
No. 329,742. Patented Nov. 3, 1885.
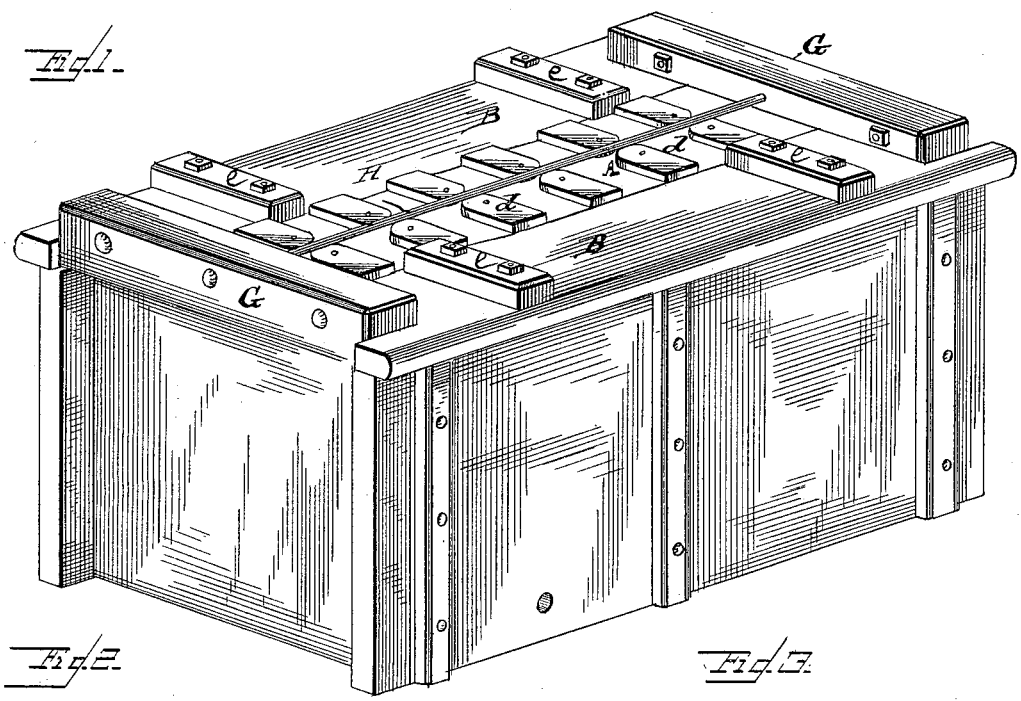
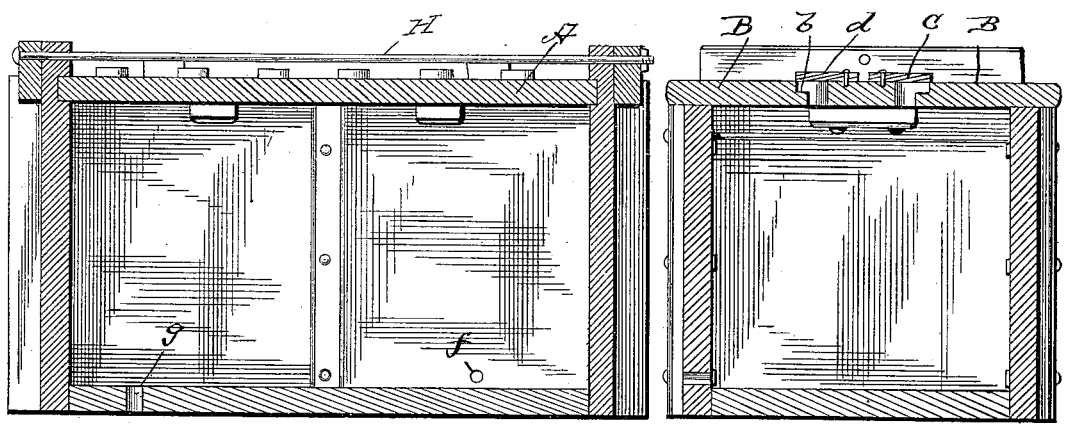
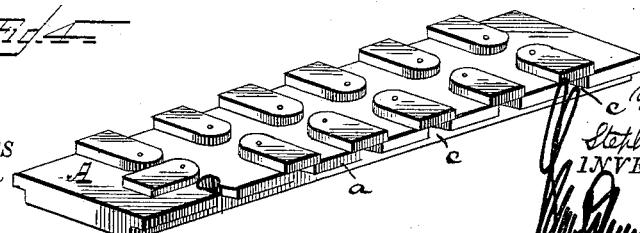
WITNESSES
INVENTORS
Attorney

UNITED STATES PATENT OFFICE.

ROBERT H. HORNE AND STEPHEN C. SMITH, OF MARION, INDIANA.

BOX FOR SCALDING POULTRY.

SPECIFICATION forming part of Letters Patent No. 329,742, dated November 3, 1885.

Application filed April 2, 1885. Serial No. 161,039. (No model.)

*To all whom it may concern:*

Be it known that we, ROBERT H. HORNE and STEPHEN C. SMITH, citizens of the United States of America, residing at Marion, in the county of Grant and State of Indiana, have invented certain new and useful Improvements in Boxes for Scalding Poultry; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to boxes or troughs for scalding poultry; and it consists in the improvements hereinafter described, whereby the body of each fowl is subjected to a thorough steaming operation, the feathers preserved from matting, and the head preserved from the action of the steam, so that the gills, eyes, &c., may retain the color indicative of a freshly-killed fowl, thus producing a more salable article.

In the accompanying drawings, forming a part of this specification, Figure 1 is a perspective view of our improved scalding tank or box. Fig. 2 is a central longitudinal section through the center of said scalding-tank. Fig. 3 is a transverse section through said tank, and Fig. 4 is a detail perspective view of the central portion of the top.

The sides, ends, and bottom of the tank are constructed and arranged relative to each other so that in conjunction with the top or cover sections a closed steaming-chamber is formed. The said top consists of a central longitudinal section with a rabbeted edge, $a$, at each side, and adapted to receive and engage like edges, $b$, on the side sections, B. The said central section, A, is provided at each side with a series of openings, $c$, and on its upper face, at either side of its center, with elongated buttons $d$, designed to cover said openings. It will be noticed that each side section, B, is designed to be slid into position, so as to contact with the central section, A, cleats $e$ being provided for the manipulation of said side sections.

$f$ refers to an opening by which steam is introduced into the chamber, and $g$ a discharge for the water resulting from condensation. It will be observed that the inner portion of each of said openings $c$ is slightly larger than the remainder of the opening. In practice the side sections, B, are removed and the neck of a fowl passed into one of the openings $c$ until it reaches the enlarged portion thereof, after which the fowl may be pulled down until the head of the same rests snugly upon the upper side of said section A, outside of the chamber, while the body is suspended within said chamber to be subjected to a thorough steaming operation therein. The remaining recesses $c$ are successively filled with fowls, as previously described, after which the sections B are slid into position to close the chamber, the rabbeted joints presenting substantially steam-tight joints. By this means the fowls suspended in the tank are subjected to regular steaming process sufficient to answer all purposes and without affecting either the head portion of the fowl or the clothes of the attendant.

In order to brace and properly re-enforce the parts, a transverse batten, G, is secured at each end, and is perforated for the passage of a rod, H, one end of which is headed, while the other is threaded for the engagement of a securing-nut.

We claim—

A tank for scalding poultry, consisting of a steaming-chamber provided with inlet and outlet ports and having the top in three sections, the central section being stationary and provided on the sides with a series of openings and on its top with buttons to cover said openings, substantially as described, and for the purpose set forth.

In testimony whereof we affix our signatures in presence of two witnesses.

ROBERT H. HORNE.
STEPHEN C. SMITH.

Witnesses:
JOHN HASTSOOK,
WILLSON SMITH.